Patented July 26, 1927.

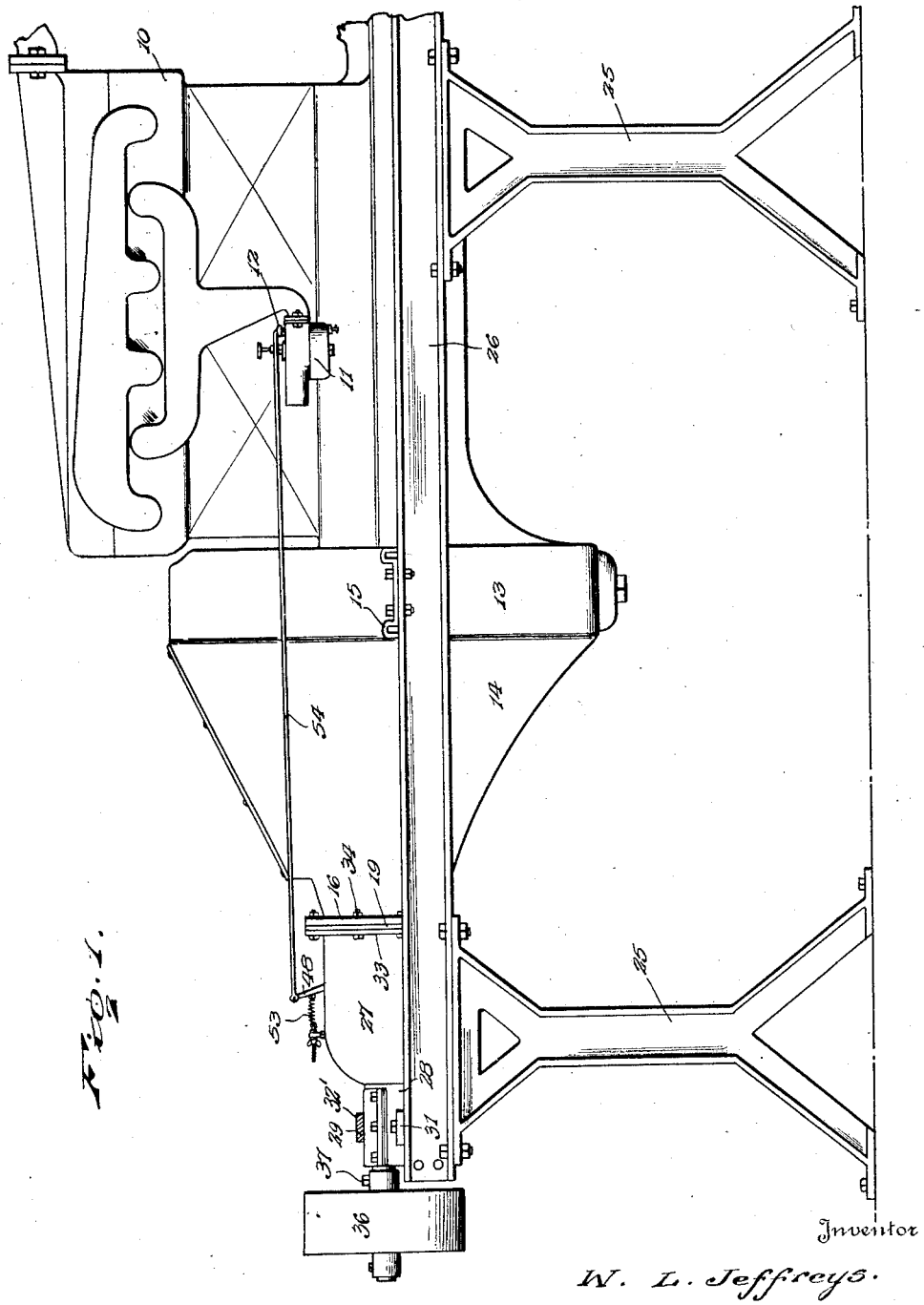

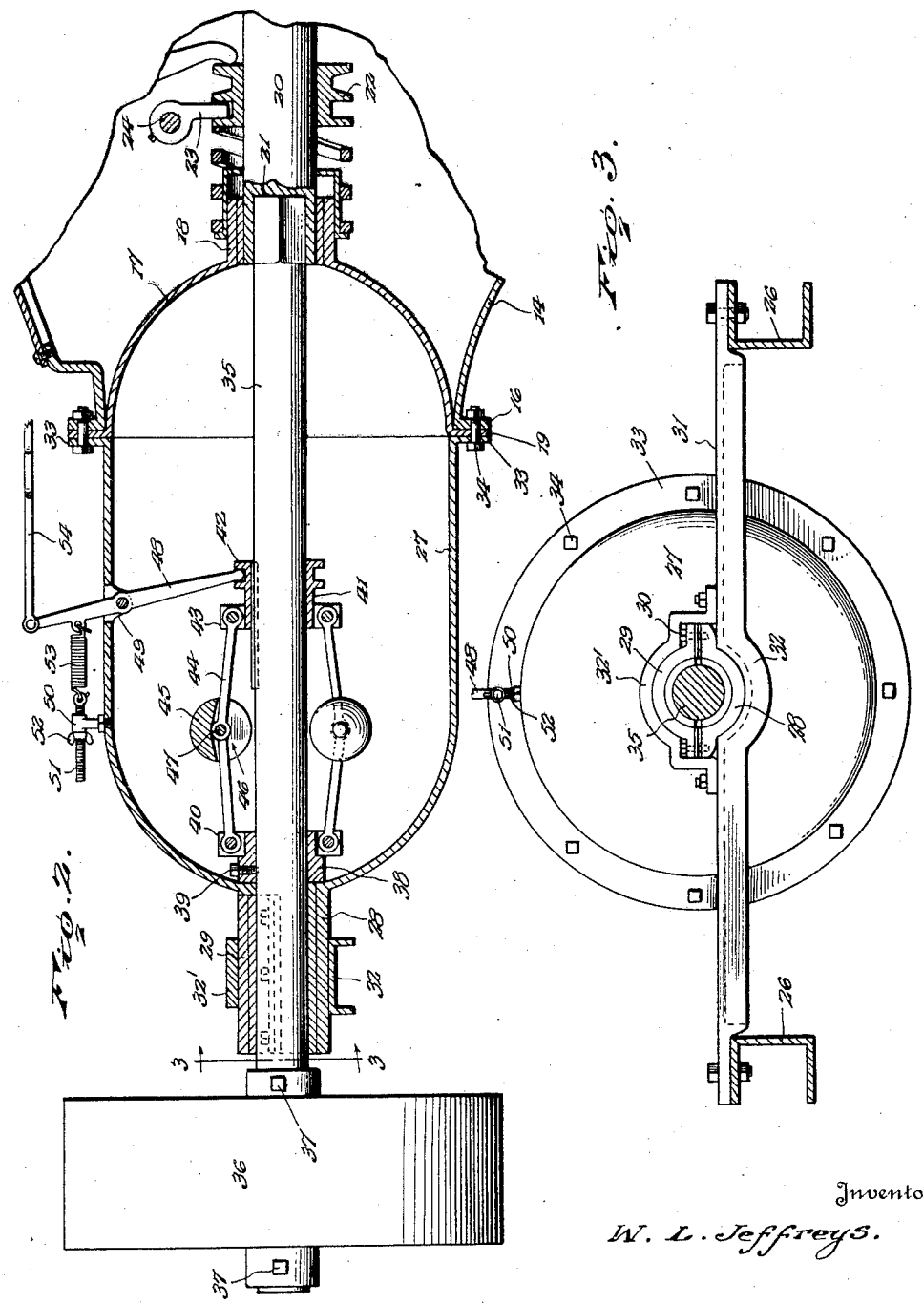

1,637,115

UNITED STATES PATENT OFFICE.

WILLIAM L. JEFFREYS, OF RIVERTON, NEBRASKA.

POWER PLANT.

Application filed August 21, 1925. Serial No. 51,719.

This invention relates to an improved power plant and seeks, among other objects, to provide a mechanism whereby the engine of a Ford vehicle may be readily utilized for general power purposes.

The invention seeks, as a further object, to provide a power plant embodying a power take-off having a governor for actuating the engine throttle in response to the load and automatically controlling the speed of the engine.

And the invention seeks, as a still further object, to provide a mechanism wherein the power take-off may be readily applied without the necessity for structural change in the engine.

Other objects of the invention not above specifically mentioned will appear as the description proceeds.

In the accompanying drawings:

Figure 1 is a side elevation of the power plant.

Figure 2 is a fragmentary longitudinal sectional view particularly showing the power take-off.

Figure 3 is a transverse sectional view on the line 3—3 of Figure 2, looking in the direction indicated by the arrows.

Referring now more particularly to the drawings, I have illustrated a conventional Ford engine at 10. The engine carbureter is indicated at 11, and this carbureter is provided with the usual throttle valve lever 12. The flywheel case of the engine is indicated at 13, and the transmission case at 14. The flywheel case is provided with the usual brackets 15 while at the rear end of the transmission case is the customary radial flange 16. In Figure 2 is shown the front universal ball cap 17. This cap fits in the rear end of the housing 14 and is provided with a bearing 18 as well as with a radial flange 19 which seats against the flange 16 of the housing. Journaled in the bearing 18 is the engine drive shaft 20 which is equipped at its forward end with the driving plate of the engine clutch while, at its rear end, said shaft is provided with a squared socket 21. Slidable on the shaft is the usual spring-actuated clutch shift collar 22 which is movable rearwardly to disengage the clutch by a lever 23 on the foot pedal operated shaft 24. All of the structure thus far described is in accordance with standard practice but has been noted in a general way in order to better bring out the construction, operation and function of the present invention.

In carrying the invention into effect, I employ a stand having legs 25, and mounted on said legs are parallel side bars 26 spaced apart to receive the engine 10 therebetween. The brackets 15 are bolted to these side bars for supporting the engine near the rear end thereof while suitable means may be provided to engage the side bars near the forward end of the engine, for supporting the engine at its forward extremity. The usual propeller shaft of the vehicle engine is detached as is also the rear universal ball cap, and in lieu of said cap I provide a cylindrical casing 27 having a rounded rear end from which projects an elongated axially disposed bearing 28. As shown in Figure 3, this bearing preferably incorporates a removable bearing cap 29 which is secured by cap bolts 30, and extending transversely between the side bars 26 of the stand beneath the bearing is a cross bar 31 rigidly supporting the casing 27 at its rear end. The cross bar may be bolted to the side bars 26, being provided with a bowed portion 32 seating the bearing 28 flat therein, and fitting over the bearing is a cap plate 32' bolted to said cross bar for rigidly anchoring the casing 27 at its rear end. Formed on said casing at its forward end is a radial annular flange 33 mating with the flange 19 of the front universal ball cap 17 of the engine, and extending through said flanges and through the flange 16 of the transmission housing 14, are circumferentially spaced bolts 34 rigidly securing the parts together.

The bearing 28 of the casing 27 alines with the bearing 18 of the cap 17, and journaled through the former bearing is a power take-off shaft 35 squared at its forward end to fit in the squared socket 21 of the drive shaft 20 of the engine. Removably fixed to the rear end of the shaft 35 is a power transmitting device which may be in the form of a pulley 36 secured to the shaft by set bolts 37, and, as will be observed, the pulley is arranged externally of the frame of the stand so that a belt may be readily trained about said pulley. The elongation of the bearing 28 is, of course, provided to withstand the lateral thrust on the shaft exerted by the belt and preferably, shims are employed in connection with said bearing, as shown in Figure 3, so that by removing said shims wear on the bearing may be readily taken up.

Fixed to the shaft 35 within the rear end of the casing 27 is a sleeve 38 secured to the shaft by a stud bolt 39. The sleeve is disposed to abut the forward end of the bearing 28 for limiting the shaft 35 against rearward movement, and formed on said sleeve are radial ears 40. Splined on the shaft forwardly of the sleeve 38 is a companion sleeve 41 having parallel annular flanges 42, and projecting from the rear end of the sleeve are radial ears 43. Pivoted between the ears 40 and 43 of the sleeves are links 44, and straddling the meeting ends of said links are governor weights 45. The weights are provided with slots 46 to freely receive the links, and extending through the links and through said weights are pins 47 pivotally connecting the weights with the links as well as pivotally connecting the links with each other. Extending through the wall of the casing 27 at its upper side is a lever 48 which is pivoted upon a lug 49 extending from said wall and is freely engaged at its lower end between the flanges 42 of the sleeve 41. Fixed to the wall of the casing at the rear of said lever is a post 50, and screwed through a sleeve at the upper end of said post is a rod 51 carrying a wing nut 52 to coact with the sleeve. Extending between said rod and the upper end of the lever 48 is a spring 53 acting through the lever to urge the sleeve 41 forwardly. Connecting the upper end of the lever with the throttle valve 12 of the engine carbureter 11 is a rod 54.

As will now be seen, when the engine is in operation, the shaft 24 may be rocked by its foot pedal for actuating the engine clutch to connect the shaft 20 with the source of power or disconnect said shaft from said source so that the rotation of the shaft may be readily controlled in the usual manner. When the shaft is rotated, the shaft 35 will, of course, be driven thereby for rotating the pulley 36 and, as the shaft 35 revolves, the weights 45 of the governor will, by centrifugal force, be caused to move away from the latter shaft with the result that the sleeve 41 will, as will be readily understood in view of the foregoing description, be drawn rearwardly to rock the lever 48 against the resistance of the spring 53. The rod 54 will accordingly be actuated for swinging the throttle valve lever 12 and proportionately closing the engine throttle. Thus, the governor will function to maintain the engine at a relatively constant speed and by turning the nut 52, the tension of the spring 53 on the lever 48 may be adjusted for varying the normal speed of the engine.

Having thus described the invention, what I claim is:

1. In a power plant, the combination of an engine having a drive shaft, a transmission housing enclosing said shaft, a throttle valve controlling the flow of fuel to the engine, a casing fixed to the rear end of said housing, a power take-off shaft journaled through said casing and engaged with said drive shaft, a power transmitting device carried by the latter shaft, a governor mounted within the casing upon said take-off shaft and operable by said shaft, and an operative connection between the governor and said valve for regulating the speed of the engine.

2. In a power plant, the combination of an engine having a drive shaft, a transmission housing enclosing said shaft, a casing fixed to the rear end of said housing, a power take-off shaft journaled through said casing and engaged with said drive shaft, a governor mounted on said take-off shaft and enclosed by the casing, a lever pivoted upon the casing and operable by said governor, a throttle valve controlling the flow of fuel to the engine, and a connection between said lever and said valve for regulating the speed of the engine.

3. In a power plant, the combination of an engine having a drive shaft, a transmission housing enclosing said shaft, a casing fixed to the rear end of said housing, a power take-off shaft journaled through said casing and engaged with said drive shaft, a governor mounted on said take-off shaft and enclosed by the casing, a lever pivoted upon the casing and operable by said governor, a throttle valve controlling the flow of fuel to the engine, a connection between said lever and said valve for regulating the speed of the engine, a spring resisting movement of the lever by the governor, and means for adjustably tensioning said spring.

4. In a power plant, the combination of an engine having a drive shaft, a transmission housing enclosing said shaft, a casing fixed to the rear end of said housing, a power take-off shaft journaled through said casing and engaged with said drive shaft, a sleeve fixed to said take-off shaft and disposed to coact with the casing for limiting the take-off shaft against rearward movement, a second sleeve splined on the take-off shaft, governor links connecting said sleeves, weights carried by said links, a pivoted lever extending into the casing and engaged with the latter sleeve, a throttle valve controlling the flow of fuel to the engine, a connection between said lever and said valve, the latter sleeve being movable along the take-off shaft by said weights when such shaft is rotated for rocking the lever and actuating said valve to regulate the speed of the engine, and means yieldably resisting the movement of said lever.

In testimony whereof I affix my signature.

WILLIAM L. JEFFREYS. [L. S.]